Patented May 19, 1936

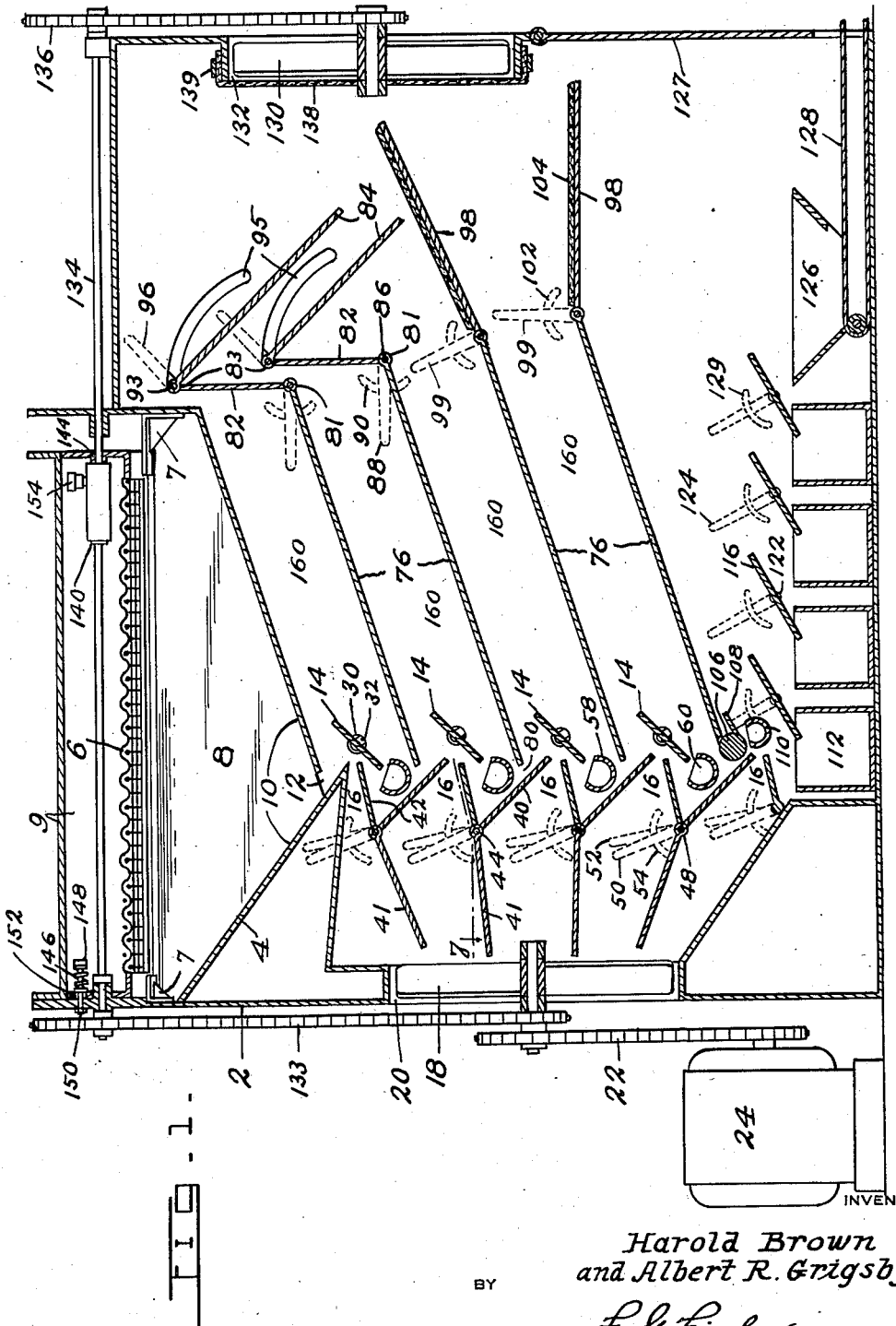

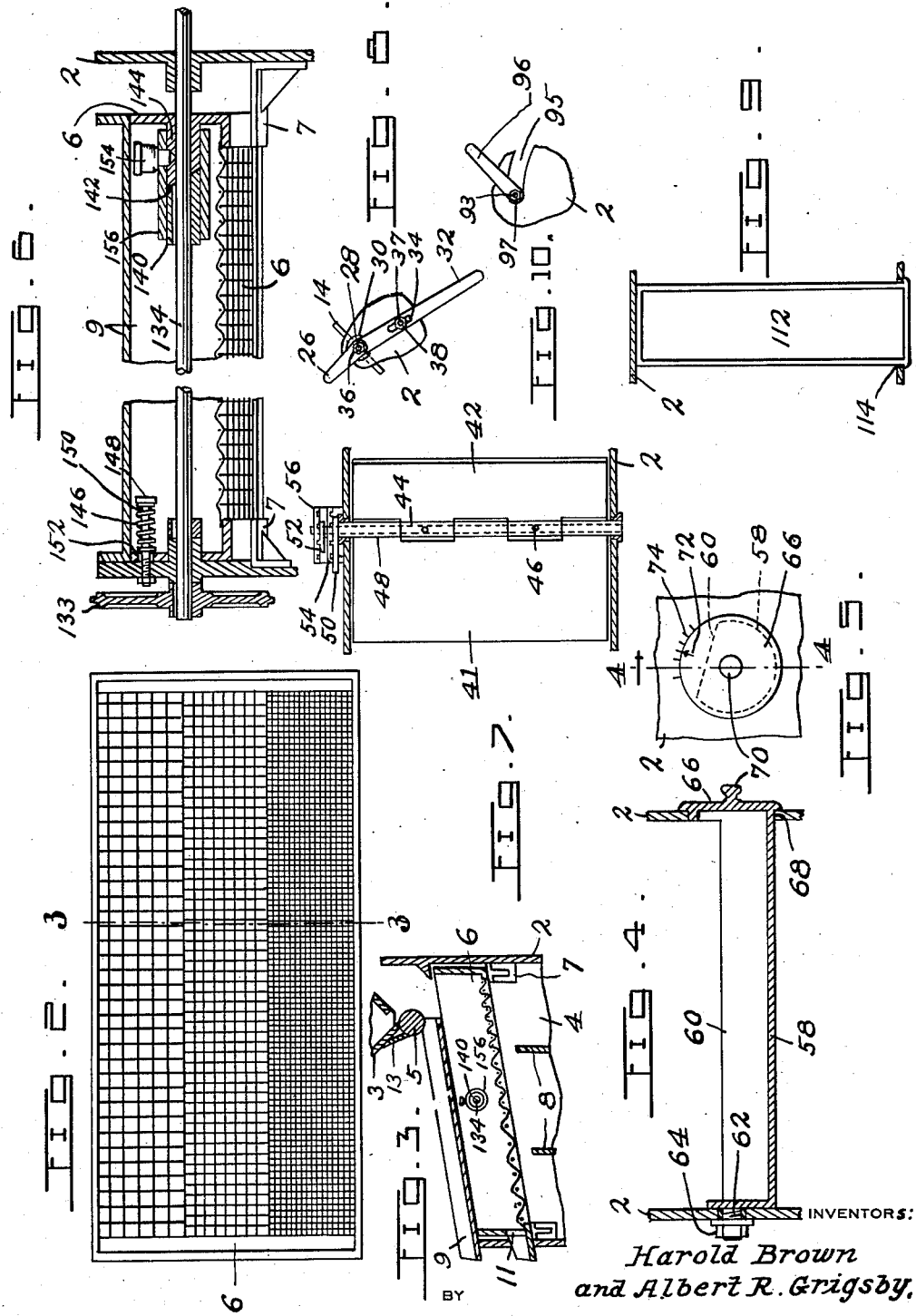

2,041,591

UNITED STATES PATENT OFFICE 2,041,591

SEPARATOR

Harold Brown, Kansas City, Kans., and Albert R. Grigsby, Kansas City, Mo., assignors to Brown-Grigsby Gold Mining Company, Kansas City, Kans.

Application April 12, 1933, Serial No. 665,746

4 Claims. (Cl. 209—35)

Our invention relates to dry separators in which a screen and an air blast are employed in the separation of materials in accordance with their size and specific gravity. In different fields of industry, and more especially in the treatment of ores, it is often desirable to separate the materials in accordance with their size and their specific gravity so that the values may be readily gathered from the foreign or waste materials.

The present invention contemplates an apparatus in which the materials may be separated efficiently without the aid of water, mercury, or acids. The invention also provides means for removing magnetized materials from the other materials treated.

In order that the invention may be fully understood, reference will now be had to the accompanying drawings, in which:

Figs. 1 is a vertical longitudinal section of the separator with some of the upper parts broken away.

Fig. 2 is a detail plan view of a screen for separating the materials in accordance with their size.

Fig. 3 shows a cross section of the screen on line 3—3 of Fig. 2, with the addition of some of the associated parts.

Fig. 4 shows a fragmentary cross section of the separator housing and a longitudinal section of one of a plurality of trays employed in carrying out the invention, the section being taken on line 4—4 of Fig. 5.

Fig. 5 is a fragmentary side elevation of the housing and an end view of one of the trays.

Fig. 6 is an enlarged broken longitudinal sectional view of the upper portion of the separator.

Fig. 7 is a fragmentary view showing a portion of the housing in section on line 7 of Fig. 1, and part of the air controlling means in plan view.

Fig. 8 is a fragmentary detail showing one of a series of baffles and means for adjusting the same.

Fig. 9 is a fragmentary longitudinal section of a portion of the separator housing with a bin removably arranged therein.

Fig. 10 is a fragmentary detail showing the controlling means for another baffle.

In the embodiment of the invention as shown a suitable housing 2 is provided. The upper portion of the separator has a hopper 3 in which the materials to be separated are initially loaded. The lower portion of the hopper 3 has a magnetic roller 5 for gathering iron, steel and magnetic materials from the other materials as the latter fall to an underlying screen 6. A scraper 13 removes the iron, steel and magnetic materials from the roller 5 and deposits them upon a chute 9 whereby they are discharged from one side of the separator. The screen 6 is located in a hopper 4 and has a number of different meshes for separating the materials in accordance with their sizes. The screen 6 is slidably mounted upon brackets 7 and, as shown by Fig. 3, is arranged in an inclined position with the fine mesh at the upper portion, the coarse mesh at the lower portion, and the medium mesh at the intermediate portion of the screen. The hopper 4, at a point below the screen 6, is divided longitudinally by partitions 8 to prevent the different sizes of the materials from again becoming intermixed as they fall upon the inclined bottom 10 of the hopper 4.

The bottom 10 has an outlet 12 through which the materials are discharged upon the uppermost one of a series of baffles 14 arranged adjacent to a series of throats 16 through which streams of air are forced from suitable air blast producing means shown in the present instance in the form of a fan 18 mounted at an air inlet 20 in the front portion of the housing 2. The fan 18 is driven by suitable means such as sprocket mechanism 22 from an engine or motor 24.

Each baffle 14 is adjustably mounted so that it may be turned axially to any point from a vertical to a horizontal plane and also moved towards or away from the adjacent throat 16, or upward, or downward as desired. In the present instance axial adjustment is accomplished with a hand lever 26, Fig. 8, fixed to one of a pair of trunnions 28 projecting from opposite ends of the baffle 14 through apertures 30 formed in the sides of the housing 2 to allow clearance for the trunnions 28 when the baffle 14 is adjusted to the different positions above-mentioned. The forward, backward, upward and downward movements are accomplished with a pair of hand levers 32 in the upper ends of which the trunnions 28 are journaled to permit the baffle 14 to be rocked to different inclinations by means of the lever 26. The levers 32 have pin-and-slot connections 34 with the adjacent sides of the housing 2 so that they may move the baffle 14 upward, downward, forward or backward, as stated.

After the baffle 14 has been adjusted axially by the lever 26 it is secured from further axial movement by binding the lever 26 against the side of the adjacent lever 32 by a nut 36 threaded upon the adjacent trunnion 28, and after being adjusted forwardly, backwardly, upwardly, or downwardly the baffle is secured from further movement in those directions by binding the levers 32 against the housing 2 by means of nuts 38 threaded upon the associated pins 37 of the pin-and-slot connections 34.

The upper portion of the throats 16 are formed by a series of short stationary inclined planes 40 fixed to the housing 2, and the lower portion of said throats are formed by adjustable gates 41 and 42, whereby the area of the throats may be enlarged or reduced to regulate the volume of air passing therethrough. Each set of gates 41 and 42 are hingedly connected together as shown by Figs. 1 and 7, the gate 41 being fixedly mounted upon the hinge member 48, while the gate 42 is rigidly secured to the hinge pintle 44 by suitable means such as transverse pins 46. In order that the gates 41 and 42 may be rocked independently of each other to enlarge or reduce the area of the respective throat 16, the ends of the hinge member 48 are rockably mounted in the sides of the housing 2 and one of said ends is equipped with a fixedly mounted hand lever 50, while one end of the pintle 44 projects beyond said hinge member 48 and is equipped with a fixedly mounted hand lever 52. The hand levers 50 and 52 may be held at any point of their movement by engaging them with sectors 54 and 56, respectively, secured to the adjacent side of the housing 2.

The different grades of material falling from the lower portions of the baffles 14 are caught in receptacles or trays 58 which may be turned axially to carry their mouths 60 beneath the lower edges of the respective baffles 14 when the latter are adjusted to different positions through the intermediary of the levers 26 and 32. Figs. 4 and 5 which disclose one of the trays 58 in detail show it provided at one end with a trunnion 62 mounted in the adjacent side of the housing 2 and threaded for the reception of a nut 64, which upon being tightened binds the adjacent end of the tray 58 against the housing 2, and thus prevents accidental turning of the tray upon its axis. The opposite end 66 of the tray 58 is circular in form to rotatably fit within a corresponding opening 68 in the adjacent side of the housing 2.

Axial turning of the tray 58 may be readily accomplished with a knob 70 fixed to the end 66. Said knob 70 also provides convenient means whereby the tray 58 and its contents may be removed from the housing 2 after removal of the nut 64 from the trunnion 62. In order that the tray 58 may be turned axially to bring its mouth 60 into proper relation with the lower portion of the associated baffle 14 an index mark 72 is formed on the end 66 to cooperate with a scale 74 formed on the adjacent side of the housing 2.

76 designates a series of relatively long stationary inclined planes, the lower ends of which extend below the associated trays 58 and terminate within a short distance of the short inclined planes 40 which slope downwardly from the hinged portions of the gates 41 and 42, Fig. 1. Openings 80 are left between the adjacent portions of the inclined planes 40 and 76 to permit the passage of material to the underlying baffles 14.

One or more of the uppermost inclined planes 76 are connected at their upper rear ends by hinges 81 to baffles 82 which in turn are connected at their upper margins by hinges 83 to adjustable plates 84. Each baffle 82 is fixedly mounted upon the pintle 86 of the associated hinge 81, so that said baffle 82 may be rocked up or down by means of a hand lever 88 arranged exteriorly of the housing 2 and fixed to the adjacent end of the pintle 86. Both ends of the pintles 86 are rockably mounted in the sides of the housing 2. Sectors 90 are provided for holding the levers 88 in any of their adjusted positions.

The plates 84 are fixedly connected to the hinge pintles 93 which project outwardly through arcuate slots 95 in the sides of the housing 2. The outer ends of the pintles 93 are equipped with fixedly mounted hand levers 96 whereby the plates 84 may be adjusted to different inclinations or they and the baffles 82 may be raised or lowered within the limits of the slots 95. The plates 84 may be secured in any of their adjusted positions by nuts 97, Fig. 10, threaded upon the ends of the pintles 93 to bind the hand levers 96 against the sides of the housing 2.

One or more of the lowermost inclined planes 76 are equipped at their upper rear ends with rockable baffles 98 hingedly connected to said inclined planes and operated with hand levers 99 arranged exteriorly of the housing 2 and adapted to be held in any of their adjusted positions by sectors 102. The baffles 98 are equipped with fibrous material such as woolen blankets 104 for catching the finer particles of material as they are blown backwardly by the air blast.

106 designates another magnetic roller for gathering any steel, iron, or magnetic material which might escape the roller 5. The rollers 5 and 106 may be driven from the motor 24 by any suitable mechanism, not shown. Any material gathered by the roller 106 is removed therefrom by a scraper 108 and falls into an underlying receptacle 110.

112 designates a series of bins located in the lower portion of the housing 2 from one side of which latter they may be withdrawn with their contents through openings 114, Fig. 9. Any values falling from the lowermost inclined planes 40 and 76 are blown backwardly by the air blast against a series of adjustable baffles 116 which cooperate with the air blast and the force of gravity in depositing the materials according to their specific gravity, into the respective bins 112. The baffles 116 are provided with trunnions 122 rockably mounted in the sides of the housing 2. One of each pair of trunnions 122 is equipped with a fixedly mounted hand lever 124 arranged exteriorly of the housing 2 for rocking the associated baffle to various inclinations, or for adjusting it to a horizontal position to close the respective bins 112 when the material is not worth saving. The waste material blown over the bins 112 falls into a hopper 126 from which it is conducted to the exterior of the housing 2 by suitable means such as an endless conveyer 128, or if the waste material is very light it may be blown directly out of the housing 2 by opening a rear door 127 in said housing. The hand levers 124 are held in their various positions by sectors 129 on the exterior of the housing 2.

When it is desirable to increase the force of the blast created by the fan 18, I provide an auxiliary or exhaust fan 130 located in an outlet 132 in the rear wall of the housing 2. The fan 130 is driven from the motor 24 by the sprocket mechanism 22, sprocket mechanism 133, a shaft 134 and sprocket mechanism 136. If it is found that flour or flake gold is escaping through the outlet 132 a blanket or other suitable screen 138 is stretched across said outlet and removably held in place by an annular clamp 139, so that the blanket may be removed in order that the values can be readily recovered.

In order to prevent the materials from clogging the screen 6 or the various openings and passageways in the housing 2, I employ agitating means comprising a cam 140 fixedly mounted upon the shaft 134 and provided with a beveled face 142 abutting the corresponding face of a bearing 144 fixed to the adjacent wall of the screen 6 and reciprocably mounted upon the shaft 134. The bevel face of the bearing 144 is yieldably held against the face of the cam 140 by means of a spring 146 interposed between one side of the screen 6 and the head 148 of a bolt 150 extending loosely through an aperture 152 in the screen and rigidly secured to the adjacent side of the hopper 4, Fig. 6. The bearing 144 and its beveled face is supplied with lubricant from an oiler 154 extending through a sleeve 156 which excludes dust from the beveled faces of said bearing 144 and the cam 140 and also retains a portion of the oil between said faces. From the foregoing arrangement it is apparent that at each revolution of the cam 140 it will move the screen 6 to the right, Fig. 6, after which the screen will be suddenly shifted to the left by the spring 146 and strike the hopper 4 with sufficient force to jar the housing 2 and the screen 6 and thus prevent them from becoming clogged with the materials.

Briefly stated the operation is as follows: The materials to be separated are fed into the hopper 3 and pass downwardly in their passage to the screen 6. If any iron, steel or magnetic material is present it is attracted by the roller 5 from which it is removed by the scraper 13 and conveyed out of the separator by the chute 9. As the materials fall upon the upper portion of the inclined screen 6 they are separated in accordance to size by the variable mesh and fall upon the bottom of the hopper 4, the materials too coarse to pass through the coarest mesh of the screen being discharged from the apparatus through a spout 11 in the lower portion of the screen 6. As the materials pass down the inclined bottom 10 of the hopper 4 they fall through the outlet 12 and are subjected to that portion of the air blast passing through the uppermost throat 16 which separates the materials in accordance with their specific gravity. The heaviest materials fall upon the uppermost baffle 14 and are conducted thereby into the uppermost tray 58, while the lighter materials are blown backwardly into the uppermost passageway 160 through which the lightest materials pass and escape through the outlet 132 at the rear of the housing 2. The materials too heavy to be blown through the rear portion of the uppermost passageway 160 slide or roll down the uppermost inclined plane 76, from which they fall through the associated opening 80 and are treated to that portion of the air blast blowing through the second throat 16. These successive treatments of the diminishing quantities of materials are continued until the small remainder is finally separated by the air blast flowing through the lowermost throat 16. The final separation results in the materials being deposited according to specific gravity into the bins 112 while the waste material is carried off by the conveyer 126 or blown outwardly through the open door 127.

Where there is considerable waste material present it of course is desirable to get rid of the same as early as possible, so in order to obtain this result the uppermost throat 16 is adjusted to allow a large volume of air to pass therethrough while the uppermost baffles 14 and 82 are adjusted to a relatively horizontal plane to allow free passage of the waste material to the outlet 132. If it is found that considerable flour or flake gold is present in the materials as they are blown into the two lowermost passageways 160, the baffles 98 are raised so that the blankets 104 will intercept the values and prevent them from being blown through the outlet 132.

From the foregoing description it is apparent that we have provided a dry separator which is well adapted for the purpose intended, and while we have shown and described one form of the invention we reserve all rights to such other forms and modifications thereof as properly fall within the spirit and scope of the invention as claimed.

Having thus described our invention, what we claim and desire to secure by Letters Patent, is:

1. In a separator, a series of short inclined planes, a series of relatively long inclined planes descending towards the lower ends of said short inclined planes but spaced therefrom to leave openings for the passage of materials, means for directing an air blast against the materials to cooperate with the inclined planes and the force of gravity in separating the lighter from the heavier materials, a baffle at the upper portion of one of the longer inclined planes, a plate adjustably connected to the upper portion of said baffle, and means for adjusting said baffle.

2. In a separator, a hopper having an outlet for materials deposited therein, a throat arranged beneath the hopper outlet, a passageway at the rear of the throat, means for forcing a blast of air through said throat and said passageway to blow the lighter materials outwardly through the rear of the separator, a baffle adjustably mounted at the rear of said passageway for intercepting a portion of the lighter materials, a hand lever for adjusting said baffle, means for securing said hand lever in any of its adjusted positions, an adjustable tray located in the forward portion of said passageway, and a baffle mounted at the rear of the throat and adapted to be adjusted to direct a portion of the heavier materials into said tray.

3. In a separator, a hopper having an outlet for materials deposited therein, a series of superimposed throats arranged beneath the hopper outlet, a series of superimposed passageways leading rearwardly from said throats, means for forcing a blast of air rearwardly through said throats and said passageways, an adjustable baffle located in the forward portion of each passageway, a tray having a mouth located beneath each baffle and adapted to be turned axially to carry its mouth into proper relation with the associated baffle, and coacting means on the separator and the tray whereby the position of the mouth may be readily ascertained.

4. In a separator, a throat, a passageway leading rearwardly from said throat, means for blowing a blast of air through the throat and said passageway, a baffle at the rear portion of said passageway, manual means for adjusting said baffle to regulate the flow of air through the passageway, a plate extending rearwardly from the baffle, hinge means operably connecting the baffle and said plate, said hinge means including a pintle to which the plate is fixed, and a lever fixed to said pintle for adjusting the plate with respect to the baffle.

HAROLD BROWN.
ALBERT R. GRIGSBY.